(12) United States Patent  
Trenne (10) Patent No.: US 7,210,694 B2  
(45) Date of Patent: May 1, 2007

(54) INTEGRATED FRONT FORK HINGE AND BRAKE SYSTEM FOR BICYCLES

(76) Inventor: Rodney J Trenne, 2162 Sandlewood Dr., Shelby Township, MI (US) 48316

( * ) Notice: Subject to any disclaimer, the term of this patent is extended or adjusted under 35 U.S.C. 154(b) by 0 days.

(21) Appl. No.: 10/944,102

(22) Filed: Sep. 17, 2004

(65) Prior Publication Data

US 2006/0061057 A1    Mar. 23, 2006

(51) Int. Cl.
*B62K 21/02* (2006.01)

(52) U.S. Cl. .................... 280/279; 188/24.11; 280/279

(58) Field of Classification Search ................ 280/263, 280/264, 270, 274, 279, 280; 188/24.11
See application file for complete search history.

(56) References Cited

U.S. PATENT DOCUMENTS

| | | | | |
|---|---|---|---|---|
| 400,074 A * | 3/1889 | Gendron | .................... | 280/274 |
| 471,358 A * | 3/1892 | Kimball | ....................... | 280/270 |
| 4,350,360 A * | 9/1982 | Olsson et al. | ................ | 280/279 |
| 4,565,384 A * | 1/1986 | Dehnisch | ..................... | 280/279 |
| 4,600,207 A * | 7/1986 | Zosi | ........................... | 280/279 |
| 5,305,654 A * | 4/1994 | Durham | ..................... | 74/551.1 |
| 5,429,381 A * | 7/1995 | Mercat et al. | .............. | 280/279 |
| 5,609,349 A * | 3/1997 | Buckmiller et al. | ........ | 280/280 |
| 6,505,699 B1 * | 1/2003 | Christini et al. | ............ | 180/224 |
| 6,694,842 B1 * | 2/2004 | Chen | ......................... | 74/551.3 |

FOREIGN PATENT DOCUMENTS

JP              03235775 A    * 10/1991

* cited by examiner

*Primary Examiner*—Anne Marie Boehler  
(74) *Attorney, Agent, or Firm*—Michael D. Wiggins (57) ABSTRACT

A bicycle comprises a frame member and a front fork member. A first hinge portion is integrated with the frame member and that has a first profile in a plane that is parallel to a plane defined by the front fork member. A second hinge portion is integrated with the front fork and that has a second profile in the plane, wherein the first and second profiles are complementary mating profiles.

6 Claims, 11 Drawing Sheets

INTEGRATED FRONT FORK HINGE AND BRAKE SYSTEM FOR BICYCLES

FIELD OF THE INVENTION

The present invention relates to bicycles, and more particularly to a frame, front fork hinge and brake system for bicycles.

BACKGROUND OF THE INVENTION

A bicycle includes a frame member that usually includes two triangular-shaped front and rear frame portions that have a common side. The rear frame portion usually includes two spaced and aligned rear sub-frame portions. A rear wheel is mounted for rotation between the two rear sub-frame portions.

The common side of the front and rear frame portions may support the mounting of a seat. An upper front corner of the front frame portion usually includes a cylindrical bore that removably and rotatably receives an upper part of a front fork member. Bearings may be located in the bore to facilitate rotation of the front fork member relative to the frame member. A bolt and a wedge-shaped member threadably mounted to the bolt are typically used to fix rotation of the front fork relative to a stem associated with handlebars of the bicycle.

A front wheel includes a front axle that is releasably attached to a lower end of the front fork member. For example, quick release fasteners and/or nuts may be used to attach the front axle to the front fork member. A rear wheel includes a rear axle that is releasably attached between lower rear corners of the rear sub-frame portions. Quick release fasteners and/or nuts may also be used to attach the rear axle to the rear sub-frame portions. A lower end of the common side of the front and rear frame portions includes a bore that receives bearings and a crank assembly. The crank assembly typically includes pedals that are connected by cranks to a chain wheel or front cog and a front derailleur. A chain connects the front chain wheel to a freewheel or rear cog and a rear derailleur, which are both associated with the rear wheel.

Front and rear brake levers are typically mounted on the handlebars and are connected by cables to front and rear brake assemblies. Each of the brake assemblies typically include a central mounting member. First and second arms with brake pads at distal ends thereof are pivotally connected to the center mounting member. A spring biases the first and second arms in an outwardly direction so that the brake pads do not contact the wheel when the brake levers are not depressed by the rider. When pressure is applied to the brake levers, the brake pads create friction which slows the wheels. This brake mechanism is typically exposed, which increases drag and reduces the esthetic appeal of the bicycle.

Since bicycles are human powered, it is advantageous to reduce the weight of the bicycle. Furthermore, the aerodynamic drag of the bicycle is preferably as a low as possible. In current bicycles, the design of the front fork member, the frame member and the brakes has not been sufficiently optimized. In other words, these structures have relatively poor aerodynamic characteristics, which increases drag. As a result, increased effort is required to sustain motion. In addition to reducing the aerodynamic drag of these structures, it would also be desirable to reduce the weight and manufacturing cost of these structures.

SUMMARY OF THE INVENTION

A bicycle comprises a frame member and a front fork member. A first hinge portion is integrated with the frame member and that has a first profile in a plane that is parallel to a plane defined by the front fork member. A second hinge portion is integrated with the front fork and that has a second profile in the plane, wherein the first and second profiles are complementary mating profiles.

In other features, the frame member and the first and second hinge portions include a composite material. One of the first and second hinge portions has a first projection. The other of the first and second hinge portions second and third projections, wherein the first projection is received between the second and third projections.

In other features, at least one sleeve is received in bores of one of the first and second hinge portions. At least one bearing is received in bores of the other of the first and second hinge portions. An axle that is received by the at least one sleeve and the at least one bearing. The at least one sleeve, the at least one bearing and the axle allow the front fork member to pivot relative to the frame member.

In still other features, the second hinge portion has a generally elliptical-shaped cross section. The first and second hinge portions have outer surfaces that generally align with each other to form a substantially smooth surface when the front fork member is perpendicular to the frame member. The front fork member includes an integrated brake structure that defines a cavity for reciprocally receiving a brake pad, wherein the brake structure has an outer profile with a smaller cross sectional width in a vertical plane than in a horizontal plane.

In yet other features, a handlebar is connected to the front fork member. A brake lever assembly includes a brake lever that is pivotably connected to the handlebar and a plunger is received in a bore. A fluid coupling line is in fluid communication with the cavity and the brake lever assembly. When pressure is applied to the brake lever, fluid pressure biases the brake pad out of the cavity.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. For purposes of clarity, the same reference numbers will be used in the drawings to identify the same elements.

Figure 1:
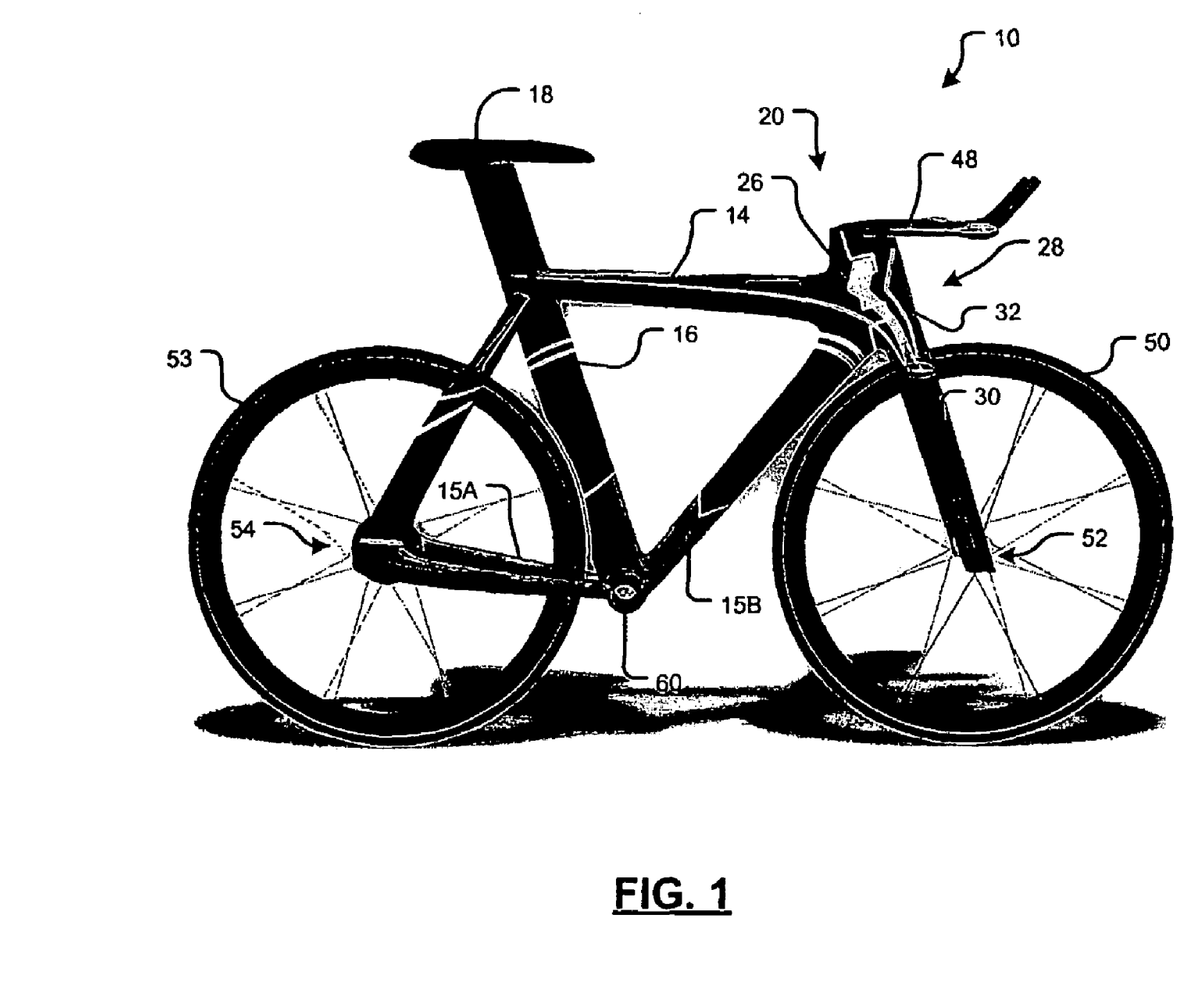
FIG. 1 is a side view of an exemplary bicycle according to the present invention.
Figure 2:
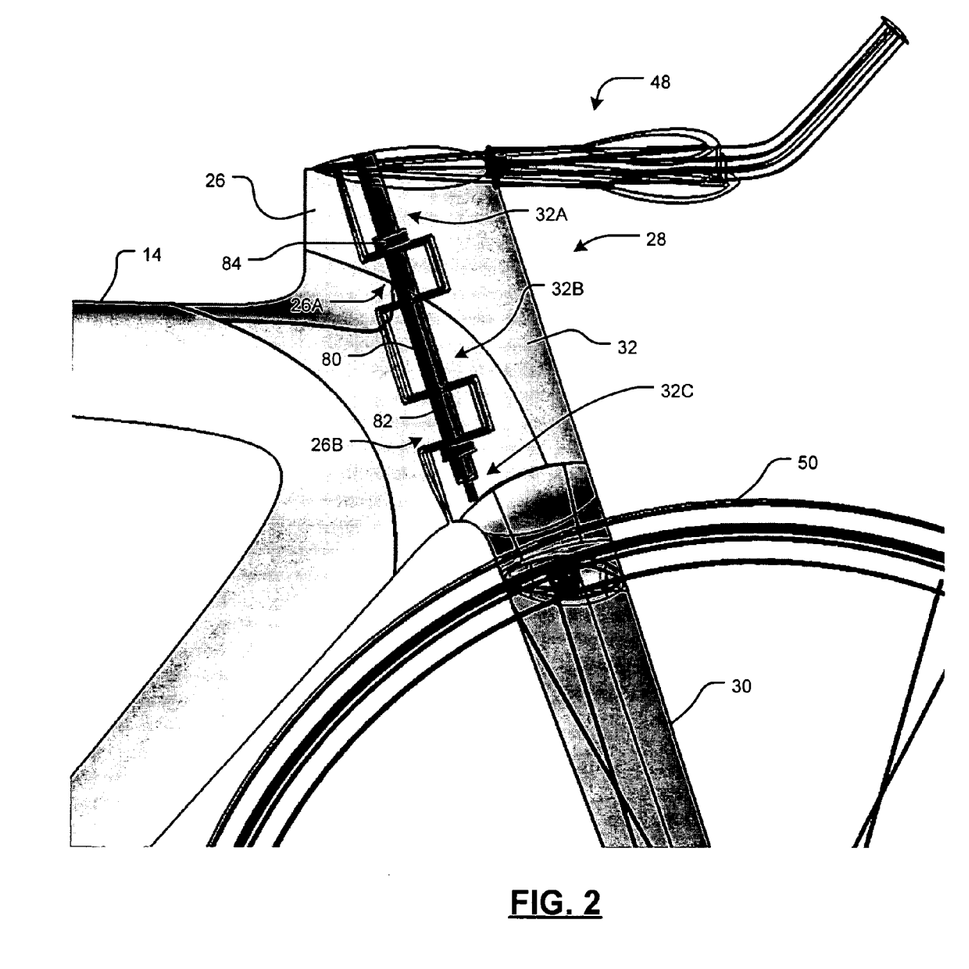
FIG. 2 is a side view of an exemplary front fork member and hinge according to the present invention.

Referring now to FIG. 1, a bicycle 10 according to the present invention is shown. The bicycle 10 includes a frame member 14 with generally triangular-shaped front and rear frame portions 15A and 15B having a common side 16. The common side 16 generally supports mounting of a seat 18. An upper front corner 20 of the front frame portion 15A includes a first mating hinge portion 26. A top end 28 of a front fork member 30 includes a second mating hinge portion 32.

The bicycle 10 further includes handlebars 48 that are attached to the top end 28 of the front fork member 30. In one embodiment, the handlebars 48 are removably attached to the top end 28 using a suitable fastener. A front wheel 50 includes a front axle 52 that is releasably and rotatably attached to a lower end of the front fork member 30. For example, quick release fasteners and/or nuts (not shown) may be used to attach the front axle 52 to the front fork member 30. A rear wheel 53 includes a rear axle 54 that is releasably and rotatably attached to a lower rear corner of the rear frame portion 15B. Likewise, quick release fasteners and/or bolts (also not shown) may be used to attach the rear axle 54 to the rear sub-frame portions 15B.

A lower end of the common side 16 of the front and rear frame portions 26 and 32, respectively, includes a bore 60 that receives bearings and a crank assembly (both not shown). The crank assembly typically includes pedals connected by cranks to a chain wheel or front cog and a front derailleur (not shown). A chain connects the front chain wheel to a freewheel or rear cog and a rear derailleur (not shown).

Referring now to FIGS. 2–5, additional details of the front fork member 30 and the first and second mating hinge portions 26 and 32, respectively, are shown. The first and second mating hinge portions 26 and 32, respectively, have complementary and/or interleaved shapes. For example, the second mating hinge portion 32 has a generally "E"-shaped profile that defines first, second and third projecting portions 32A, 32B and 32C. The first mating hinge portion 26 has a profile that is received by the "E"-shaped profile and includes third and fourth projecting portions 26A and 26B that are received by spaces defined between the first, second and third projecting portions 32A, 32B and 32C.

Figure 4:
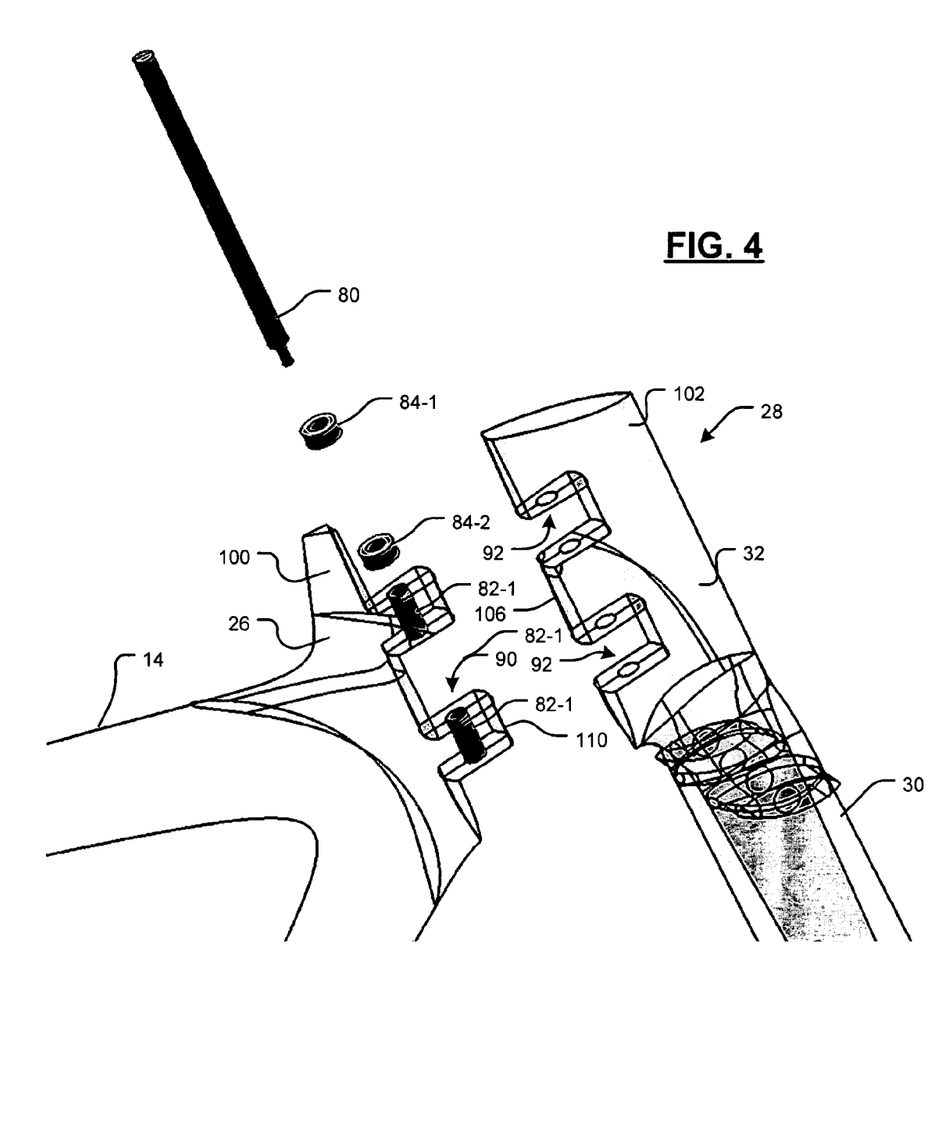
FIG. 4 is an assembly view of the frame member, the front fork member and the hinge.
Figure 5:
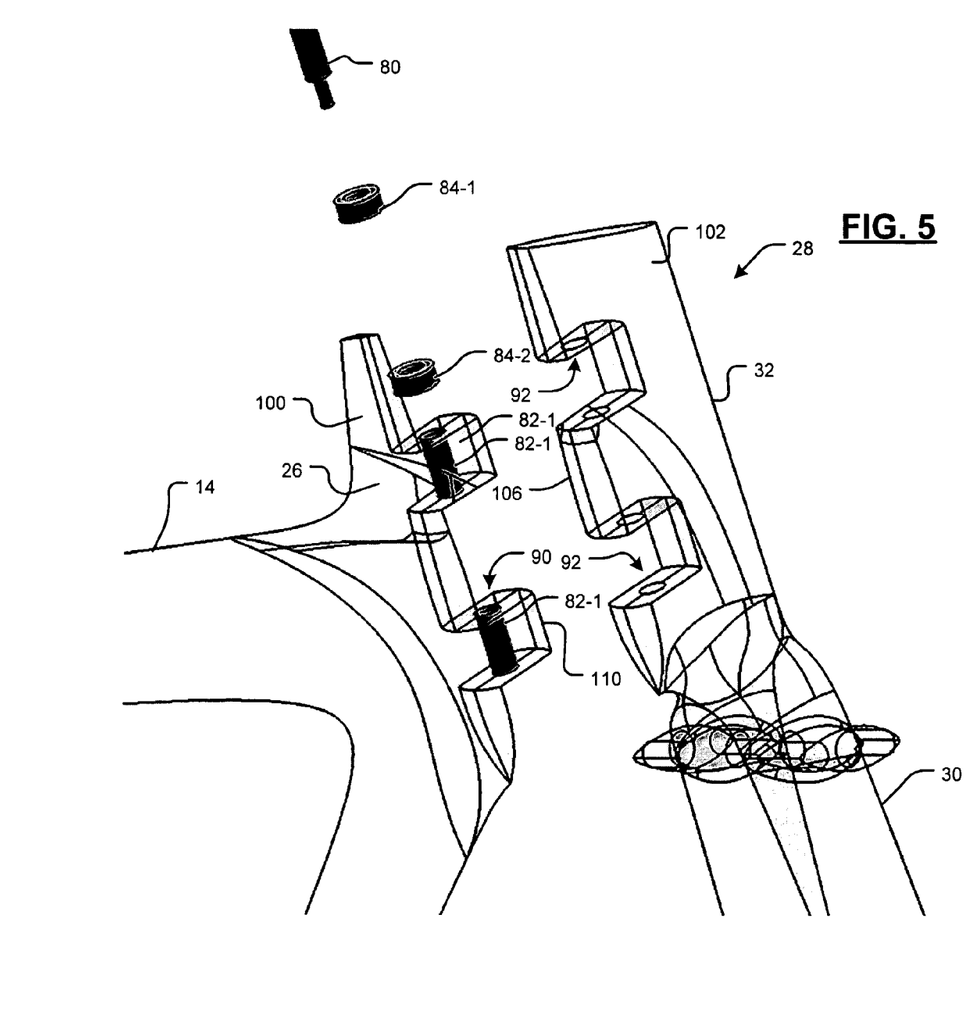
FIG. 5 is an assembly view of the frame member, the front fork member and the hinge.

The first and second mating hinge portions 26 and 32, respectively, are rotatable about a center axis defined by an axle 80. In one implementation, the axle 80 is supported by one or more sleeves 82 and/or bearings 84. In FIG. 4, the first mating hinge portion 26 includes bores 90 that receive first and second sleeves 82-1 and 82-2 and the second mating hinge 32 portion includes bores 92 that receive bearings 84-1 and 84-2.

Figure 3:
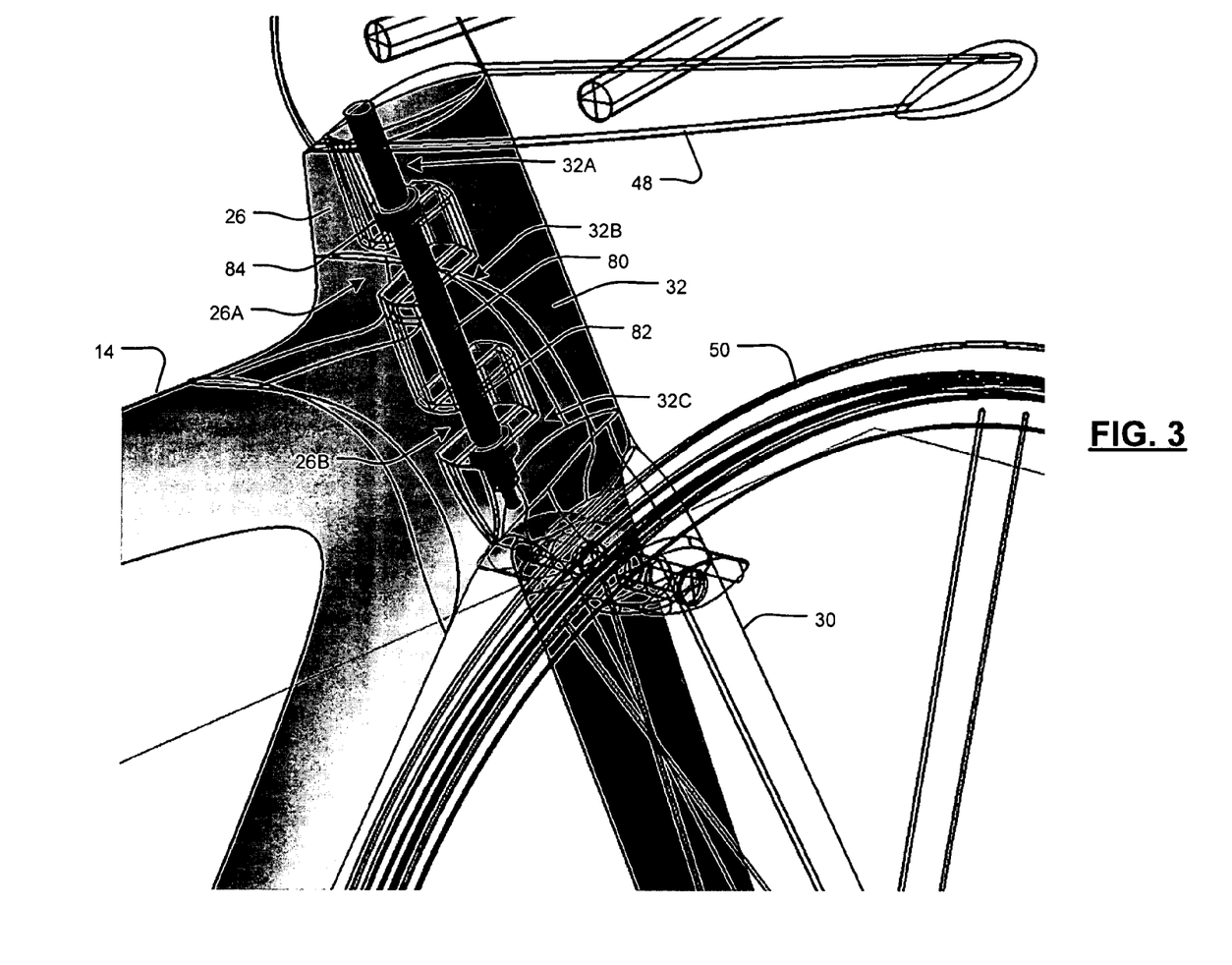
FIG. 3 is a perspective view of the front fork member and the hinge of FIG. 2.

The first and second mating hinge portions 26 and 32 preferably have an aerodynamic profile, particularly when the handlebars 48 are oriented perpendicular to the frame member 14. In the implementation shown, the first and second mating hinge portions 26 and 32, respectively, have a generally elliptical-shaped cross section in a plane that is perpendicular to the axle 80. In other words, a front part of the second mating hinge portion 32 has a width that is less than a width of mid-portion thereof as best shown in FIGS. 3 and 4. Sides 100 and 102 of the first and second mating hinge portions 26 and 32, respectively, generally align with one another when the handlebars 48 are oriented perpendicular to the frame member 14. A transition between sides 102 and rearwardly facing edges 106 of the second mating hinge portion 32 can be rounded somewhat if needed to prevent interference. Likewise, a transition between sides 100 and frontwardly facing edges 110 of the first mating hinge portion 26 can be rounded if needed. The frontwardly and rearwardly facing edges 110 and 106, respectively, can be generally planar, although other shapes can be used.

The frame member 14 and the mating hinge portions 26 and 32 can be made of any suitable material. For example, the frame member 14 and the mating hinge portions 26 and 32 can be made of a composite material that includes carbon fiber and/or other composite materials.

As can be appreciated from the foregoing, the front fork member 30 and the mating hinge portions 26 and 32 of the present invention have a significantly reduced profile relative to conventional front fork designs. As a result, the aerodynamic drag produced by the front fork member 30 and the mating hinge portions is reduced. Furthermore, the front fork member 30 and the mating hinge portions 26 and 32 can be made of lightweight materials such as composites, which reduce the weight of the bicycle, although other materials can be used. In addition, the aesthetic design of the bicycle frame is significantly improved relative to conventional designs that are not as well integrated with the frame.

Figure 6:
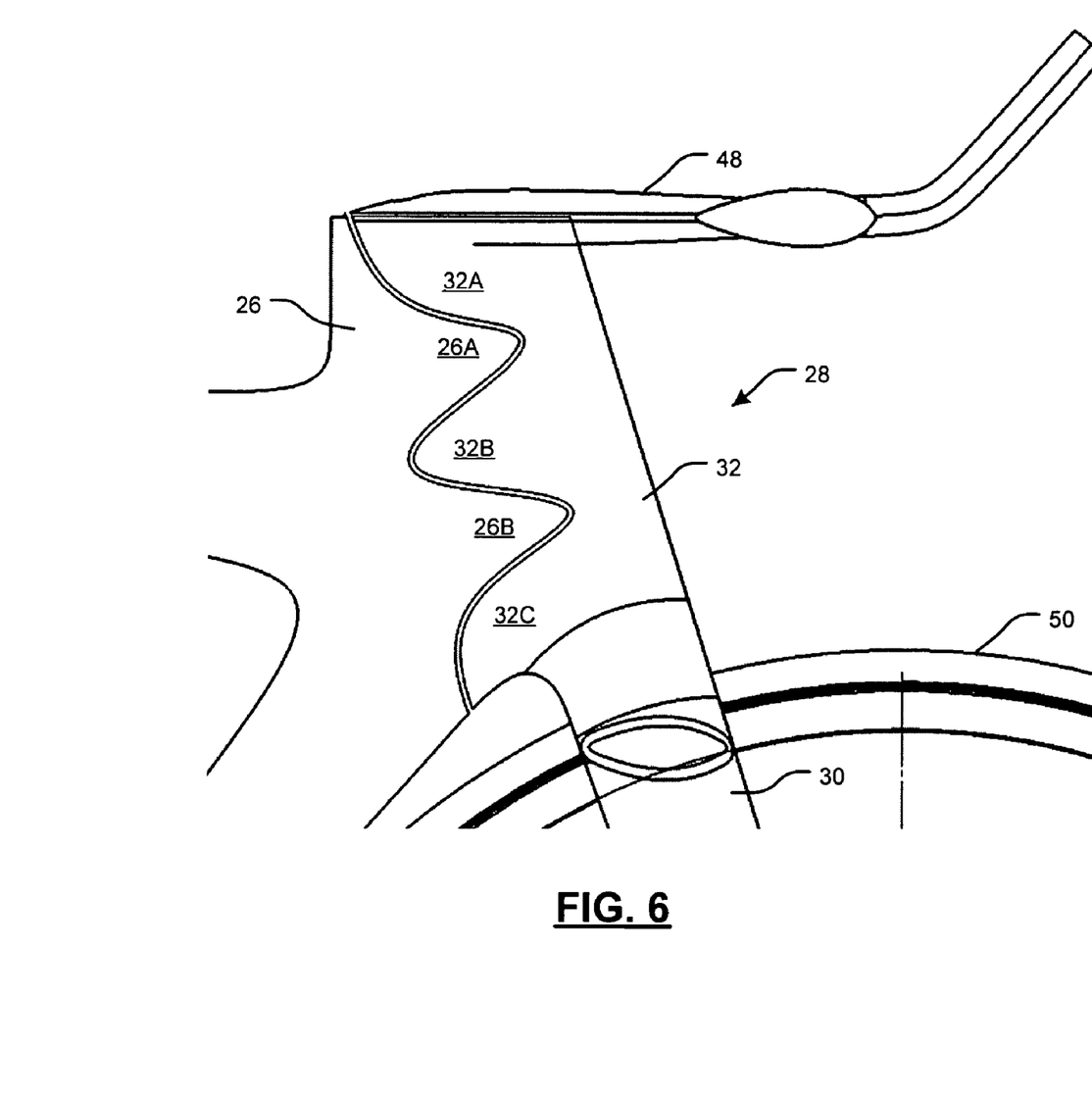
FIG. 6 illustrates another exemplary hinge.
Figure 7:
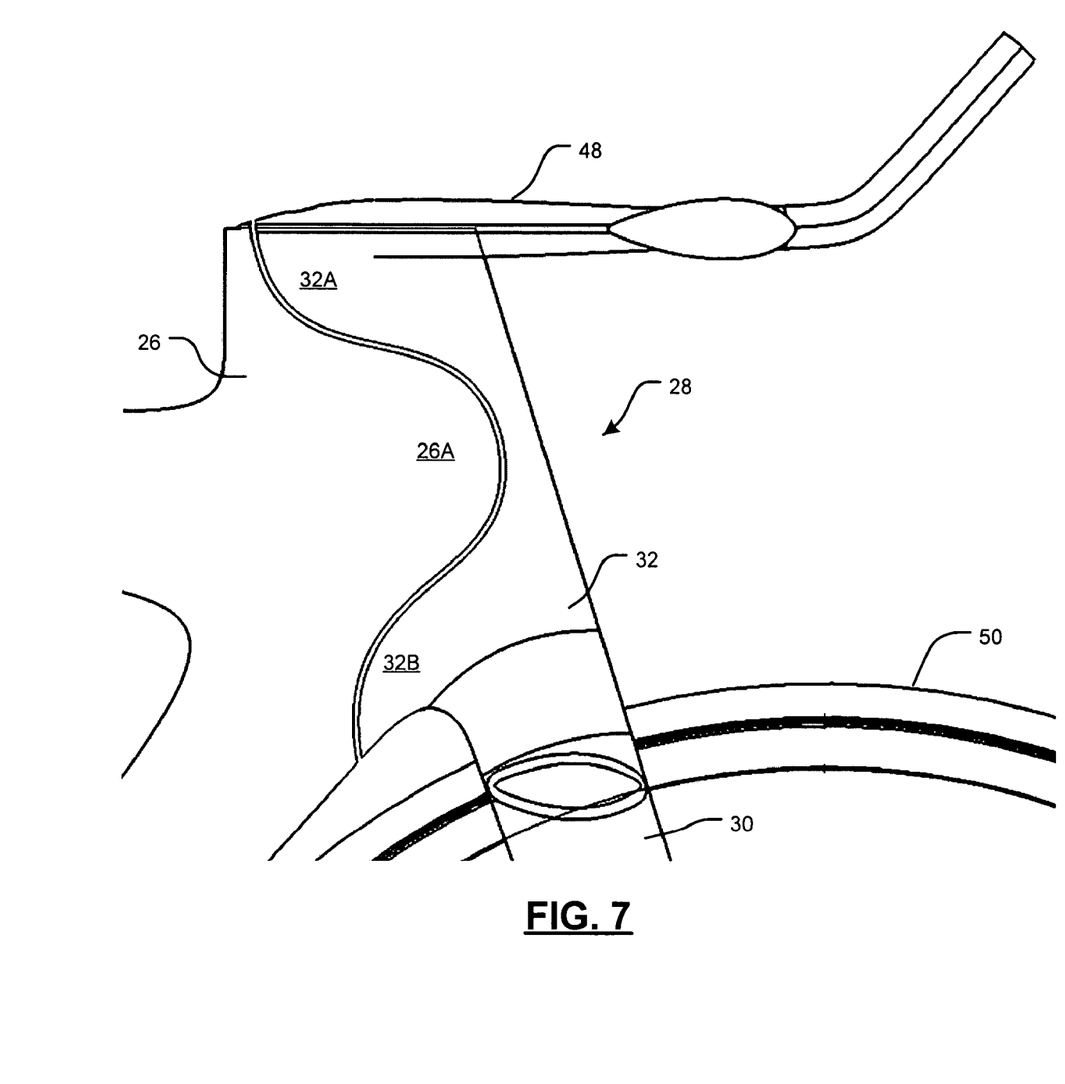
FIG. 7 illustrates still another exemplary hinge.

Referring now to FIGS. 6 and 7 additional exemplary profiles for the first and second mating hinge portions are shown. In FIG. 6, the first and second mating hinge portions 26 and 32, respectively, have a generally zig-zag or sinusoidal shape. The first mating hinge portion 26 includes projecting portions 26A and 26B that are received by spaces defined between projecting portions 32A, 32B and 32C. As can be appreciated, the number of projecting portions on the first and second mating hinge portions 26 and 32 can be varied. In FIG. 7, the first mating hinge portion 26 includes a first projecting portion 26A and the second mating hinge portion 32 includes first and second projecting portions 32A and 32B.

Figure 8:
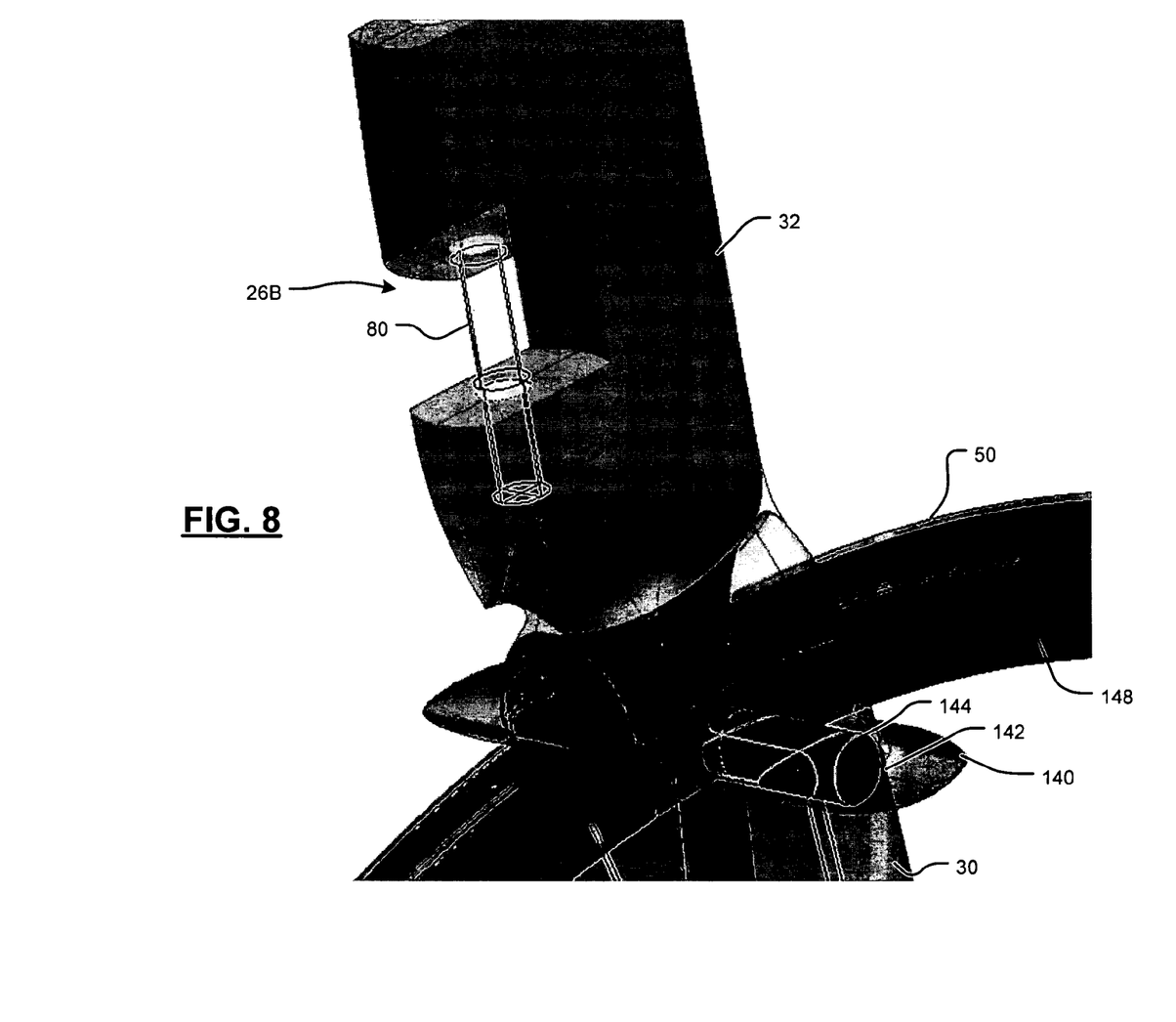
FIG. 8 illustrates a front fork with an exemplary integrated hydraulic brake structure.

Referring now to FIG. 8, the front fork member 30 includes an integrated hydraulic brake structure 140 that defines a cavity 140 that reciprocally receives a brake pad 144. The integrated hydraulic brake structure 140 preferably has an aerodynamic outer profile. In other words, the lower brake mechanism is housed within the outer surface of the fork. For example, a generally elliptical outer surface can be used. In one embodiment, the vertical height is substantially shorter than the horizontal length. In another embodiment, the vertical height is less than 50% of the horizontal length. In still, another embodiment, the vertical height is less than 33% of the horizontal length. The outer profile may also have a wing shape. Still other aerodynamic shapes are contemplated.

While the cavity 140 and the brake pad 144 have a generally cylindrical shape in FIG. 8, other shapes may be employed. As will be described further below, variable fluid pressure is employed to drive the brake pad 144 towards sides 148 of the wheel 50 to create friction that slows the wheel(s) of the bike. When the pressure is reduced, the pressure on the brake pads 144 decreases to reduce friction and deceleration. In a fully released position, the brake pads 144 are not in contact with the sides 148 of the wheel.

Figure 9:
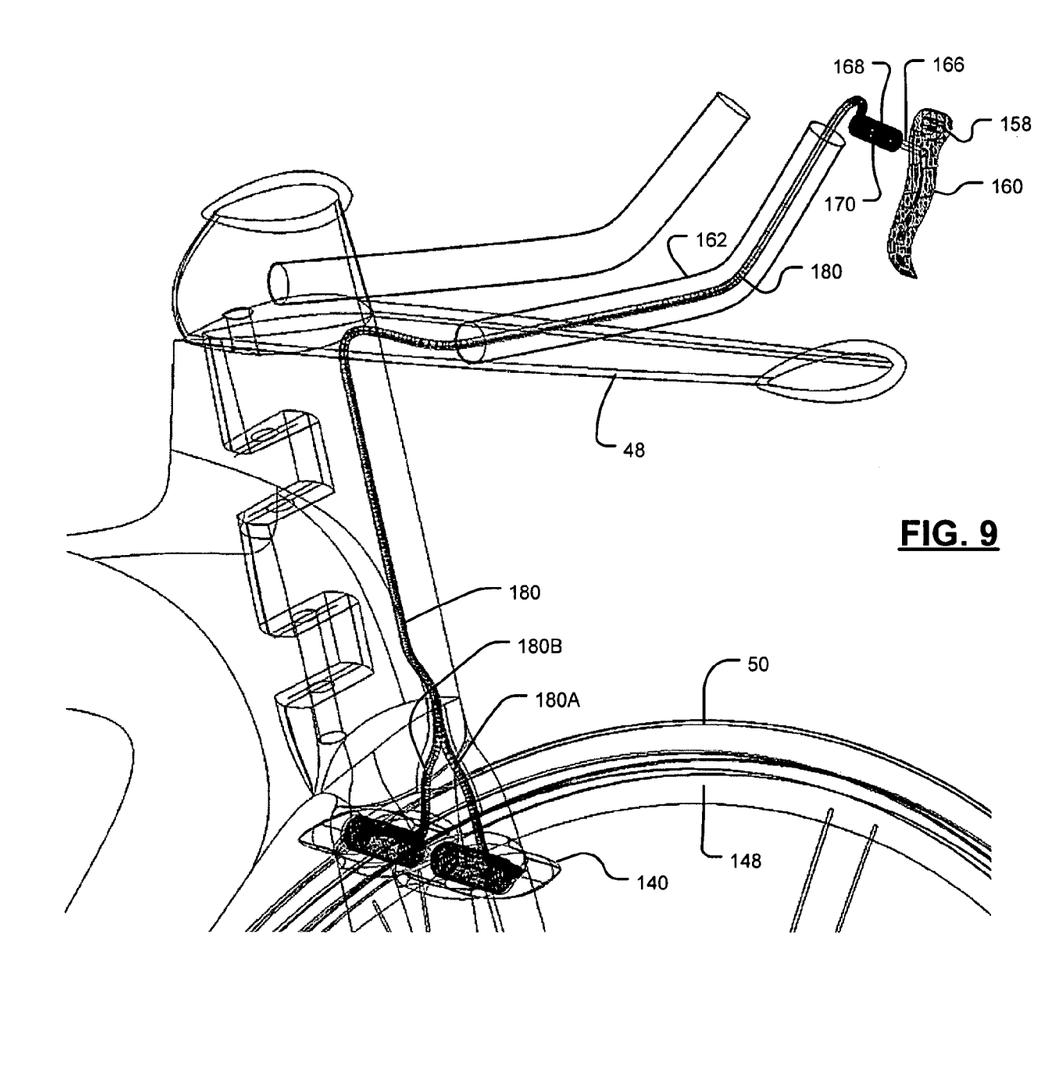
FIG. 9 is a first perspective view illustrating an exemplary brake lever that is attached to exemplary auxiliary handlebars and that is fluidly coupled to the integrated hydraulic brake structure.
Figure 10:
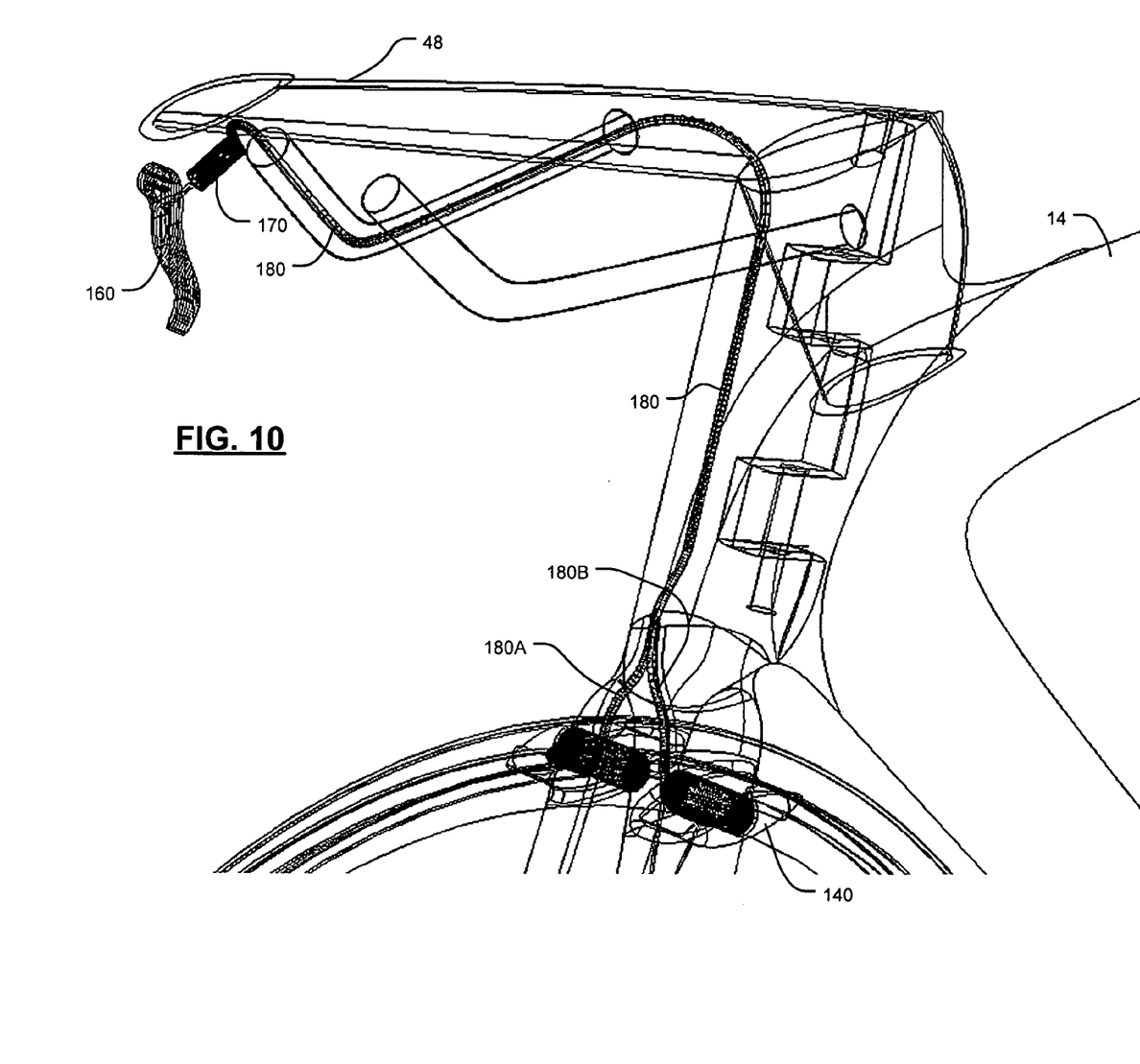
FIG. 10 is a second perspective view illustrating the brake lever, auxiliary handlebars and integrated brake structure.
Figure 11:
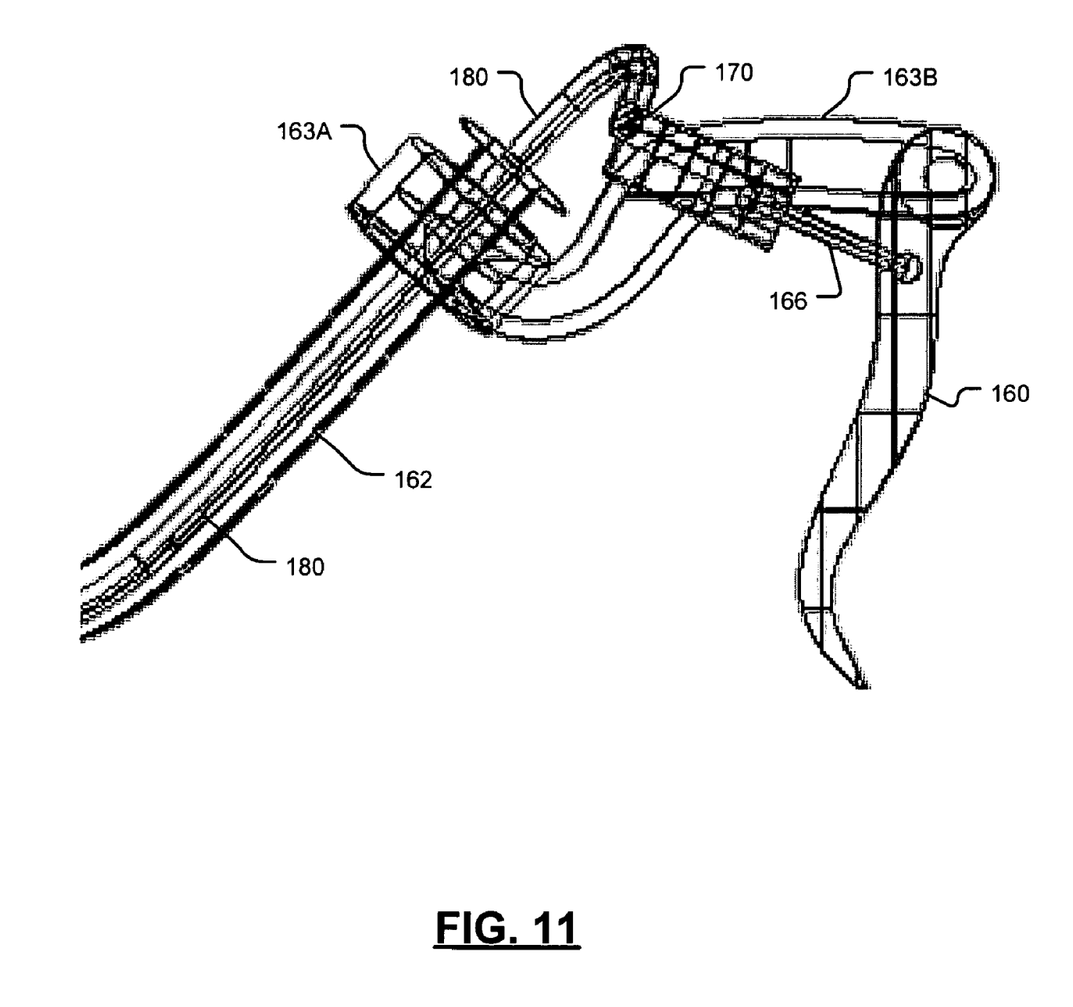
FIG. 11 is a side view illustrating the brake lever attached to the auxiliary handlebars.

Referring now to FIGS. 9–11, an upper portion 158 of a brake lever 160 is pivotably attached to auxiliary handlebars 162 and/or handlebars 48 in any suitable manner. The brake lever 160 includes a plunger 166 that moves reciprocally within a bore 168 defined by cylindrical member 170. While the cylindrical member 170 is shown, other shapes may be used. An exemplary brake supporting member 163 includes a first portion 163A that engages an outer end of the auxiliary handlebars 162 and a second portion 163B that pivotably receives the brake lever 160 and provides support for the cylindrical member 170. As can be appreciated, the brake lever 160 and brake supporting member may have other configurations. An optional spring member (not shown) may be used to return the brake lever and/or the brake pads to a non-braking position when pressure is not being applied. Alternately, hydraulic pressure may be used.

When the brake lever 160 is depressed by the rider, the plunger 166 moves inwardly into the bore 168 of the cylindrical member 170 and increases fluid pressure in a fluid line 180 that fluidly communicates with the cavity 142. As a result, the brake pad 144 moves in a direction towards the side wall 148 and engages the side walls 148, which creates friction that slows the wheel and the bicycle. The amount of friction and braking will depend upon the amount of pressure applied to the brake lever 160. The fluid line 180 can be divided into two fluid lines 180A and 180B to supply pressure to another brake assembly on the opposite side of the wheel 50. Rear brakes can employ a similar construction.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A bicycle, comprising:
   a frame member;
   a front fork member;
   a first hinge portion that is integrated with said frame member and that has a first profile in a plane that is parallel to a plane defined by said front fork member; and
   a second hinge portion that is integrated with said front fork and that has a second profile in said plane, wherein said first and second profiles are complementary mating profiles,
   wherein said front fork member includes an integrated brake structure that defines a cavity for reciprocally receiving a brake pad, wherein said integrated brake structure has an outer profile with a smaller cross sectional width in a vertical plane than in a horizontal plane.

2. The bicycle of claim 1 further comprising:
   a handlebar that is connected to said front fork member;
   a brake level assembly that includes a brake level that is pivotably connected to said handlebar, a plunger that is attached to said brake lever and a member defining above that reciprocally receives said plungers; and
   a fluid coupling line that is in fluid communication with said cavity and said brake lever assembly.

3. The bicycle of claim 2 wherein when pressure is applied to said brake lever, fluid pressure biases said brake pad out of said cavity.

4. A bicycle, comprising:
   a frame member;
   a front fork member;
   a first hinge portion that is integrated with said member and that has a first profile in a plane that is parallel to a plane defined by said front fork member;
   a second hinge portion that is integrated with said front fork and that has a second profile in said plane, wherein said first and second profiles are complementary mating profiles; and
   an axle that is parallel to said plane and that is received by bores in said first and second hinge portions,
   wherein said front fork member includes an integrated brake structure that defines a cavity for reciprocally receiving a brake pad, wherein said integrated brake structure has an outer profile with a smaller cross sectional width in a vertical plane than in a horizontal plane.

5. The bicycle of claim 4 further comprising:
   a handlebar that is connected to said front fork member;
   a brake level assembly that includes a brake level that is pivotably connected to said handlebars, a plunger that is attached to said brake level and a member defining above that reciprocally receives said plunger; and
   a fluid coupling line that is in fluid communication with said cavity and said brake level assembly.

6. The bicycle of claim 5 wherein when pressure is applied to said brake level, fluid pressure biases said brake pad out of said cavity.

* * * * *